US009317562B2

(12) United States Patent
Bandyopadhyay et al.

(10) Patent No.: US 9,317,562 B2
(45) Date of Patent: *Apr. 19, 2016

(54) DETERMINING A RELATIVE IMPORTANCE AMONG ORDERED LISTS

(71) Applicant: Indian Statistical Institute, Kolkata, West Bengal (IN)

(72) Inventors: Sanghamitra Bandyopadhyay, Howrah (IN); Debarka Sengupta, Kolkata (IN); Ujjwal Maulik, 24pgs (IN)

(73) Assignee: Indian Statistical Institute, Kolkata, West Bengal (IN)

( * ) Notice: Subject to any disclaimer, the term of this patent is extended or adjusted under 35 U.S.C. 154(b) by 229 days.

This patent is subject to a terminal disclaimer.

(21) Appl. No.: 14/049,417

(22) Filed: Oct. 9, 2013

(65) Prior Publication Data

US 2014/0046924 A1    Feb. 13, 2014

Related U.S. Application Data

(63) Continuation of application No. 13/178,361, filed on Jul. 7, 2011, now Pat. No. 8,577,873.

(30) Foreign Application Priority Data

Mar. 30, 2011   (IN) .............................. 423/KOL/2011

(51) Int. Cl.
*G06F 17/30*   (2006.01)

(52) U.S. Cl.
CPC ...... *G06F 17/3053* (2013.01); *G06F 17/30864* (2013.01); *G06F 17/30979* (2013.01)

(58) Field of Classification Search
None
See application file for complete search history.

(56) References Cited

U.S. PATENT DOCUMENTS

| 7,188,106 | B2* | 3/2007 | Dwork et al. | |
| 7,779,019 | B2* | 8/2010 | Burges | 707/758 |
| 8,131,703 | B2* | 3/2012 | Bessieres et al. | 707/706 |
| 8,171,048 | B2 | 5/2012 | Ge et al. | |
| 8,224,835 | B2 | 7/2012 | Kenedy et al. | |
| 8,332,411 | B2* | 12/2012 | Burges et al. | 707/748 |
| 8,447,760 | B1* | 5/2013 | Tong et al. | 707/728 |
| 8,898,153 | B1* | 11/2014 | Kim et al. | 707/723 |
| 2004/0249831 | A1 | 12/2004 | Fagin et al. | |
| 2005/0033731 | A1 | 2/2005 | Lesh et al. | |
| 2008/0027913 | A1 | 1/2008 | Chang et al. | |
| 2009/0112855 | A1 | 4/2009 | Guo et al. | |

OTHER PUBLICATIONS

Schimek, M.G., et al., "Inference, aggregation and graphics for top-k rank lists," accessed at http://www.r-project.org/conferences/useR-2009/abstracts/pdf/Schimek+Budinska+Lin+Mysickova.pdf, Jul. 8-10, 2009, 1 page.

Tembe et al.: "Statistical Comparison Framework and Visualization Scheme for Ranking-Based Algorithms in HighThroughput Genome-Wide Studies," Journal of Computational Biology, vol. 16, Issue 4, pp. 565-577, Apr. 2009.

Rubens et al.: "Order Retreival," pp. 310-317, 2008, accessed at http://hrstc.org/docs/Rubens___Order_Retrieval_LKR08.pdf.

(Continued)

*Primary Examiner* — Debbie Le
(74) *Attorney, Agent, or Firm* — Brundidge & Stanger, P.C.

(57) ABSTRACT

Implementations and techniques for determining a relative importance among ordered lists are generally discussed.

19 Claims, 5 Drawing Sheets

(56) References Cited

OTHER PUBLICATIONS

Thompson: "A combination of expert opinion approach to probabilistic information retrieval, part 1: The conceptual model," Information Processing & Management, vol. 26, Issue 3, pp. 371-382, 1990.
Steele et al.: "Selecting and Weighting Data for Building Consensus Gene Regulatory Networks," Proceedings of the 8th International Symposium on Intelligent Data Analysis: Advances in Intelligent Data Analysis VIII, IDA ' 09, pp. 190-201, 2009.
Dwork et al.: "Rank Aggregation Methods for the Web," Proc. 10th International World Wide Web Conference, 2001, pp. 613-620, Hong Kong.
Fagin et al.: "Comparing top k lists," SIAM Journal of Discrete Mathematics, 2003, vol. 17, No. 1, pp. 134-160.
Pihur et al.: "RankAggreg, an R package for weighted rank aggregation," BMC Bioinformatic, Feb. 19, 2009, vol. 10, No. 62, available online from http://www.biomedcentral.com/1471-2105/10/62.
Lin et al.: "Integration of Ranked Lists via Cross Entropy Monte Carlo with Applications to mRNA and miRNA Studies," Biometrics, Mar. 2009, vol. 65, pp. 9-18, The International Biometric Society.
Deconde et al.: "Combining results of microarray experiments: a rank aggregation approach," Statistical Applications in Genetics and Molecular Biology, 2006, vol. 5, issue 1, article 15.
Esquela-Kerscher et al.: "Oncomirs-microRNA's with a role in cancer," Nature Reviews Cancer, Apr. 2006, vol. 6, pp. 259-269, Nature Publishing Group.
Bartel: "MicroRNA's genomics, biogenesis, mechanism and function," Cell, Jan. 23, 2004, vol. 116, pp. 281-297, Cell Press.
Kertesz et al.: "The role of site accessibility in microRNA target recognition," Nature Genetics, Oct. 2007, vol. 39, No. 10, pp. 1279-1284, Nature Publishing Group.
Wu et al.: Several methods of ranking retrieval systems with partial relevance judgement, Journal of Information Assurance and Security, 2007, vol. 2, pp. 257-265, Dynamic Publishers, Inc.
Jarvelin et al.: "Cumulated gain-based evaluation of IR techniques," ACM Transactions on Information Systems, 2002, vol. 20, No. 4, pp. 442-446.
Kekalainen: "Binary and graded relevance in IR evaluations—comparison of the efforts on ranking of IR systems," Information & Processing Management, Mar. 5, 2005, vol. 41, No. 5, pp. 1019-1033, Elsevier Ltd.
Schamber et al.: "A reexamination of relevance: toward a dynamic, situational definition," Information & Processing Management, 1990, vol. 26, No. 6, pp. 755-776, Pergamon Press, Great Britain.
Davies: "Symbolic Systems 150," Computers and Social Decisions (Class Overview), Social Choice Theory and Electoral Systems, assessed online on Jul. 7, 2011 via http://www.stanford.edu/class/symbsys150/social-choice-theory-5-8.html.

\* cited by examiner

400 A computer program product.

402 A signal bearing medium.

404 Machine-readable instructions, which, if executed by one or more processors, operatively enable a computing device to:

obtain two or more ordered lists, wherein the two or more ordered lists are ranked search results generated in response to a query;

determine total distances between the two or more ordered lists, wherein a given total distance is determined between a given ordered list and others of the two or more ordered lists;

associated one or more importance factors to at least one of the two or more ordered lists, wherein a given importance factor associated with the given ordered list is based at least in part on the determined total distances;

determine a consensus ordered list based at least in part on an analysis of the two or more ordered lists and the associated one or more importance factors via an optimization tool; and/or transmit the consensus ordered list in response to the query.

| 406 a computer-readable medium. | 408 a recordable medium. | 410 a communications medium. |

FIG. 4

DETERMINING A RELATIVE IMPORTANCE AMONG ORDERED LISTS

CROSS REFERENCE TO RELATED APPLICATIONS

The present application is a Continuation under 35 U.S.C. §120 of U.S. application Ser. No. 13/178,361, filed on Jul. 7, 2011, titled "DETERMINING A RELATIVE IMPORTANCE AMONG ORDERED LISTS," now U.S. Pat. No. 8,577,873, which claims priority to Indian application serial no. 423/KOL/2011 filed on Mar. 30, 2011, titled "DETERMINING A RELATIVE IMPORTANCE AMONG ORDERED LISTS," the entire contents are considered as part of the disclosure of the present application are hereby incorporated by reference in their entirety.

BACKGROUND

Unless otherwise indicated herein, the approaches described in this section are not prior art to the claims in this application and are not admitted to be prior art by inclusion in this section.

Estimating the relative importance of multiple orderings has applicability in various subjects. Retrieval accuracy and efficiency in systems where multiple ranking engines produce different orderings of a set of data items have often been addressed by using aggregation. Such aggregation of multiple orderings may be based on the Condorcet principle or positional aggregation methodologies. Alternatively, such aggregation of multiple orderings may be based on using some supervised measures of accuracy of individual ordered lists or may consult some predefined accuracies corresponding to the individual ordered lists.

SUMMARY

Some example methods, apparatus, and systems related to determining a relative importance among ordered lists.

Such methods may include determining total distances between two or more ordered lists. A given total distance may be associated with a given ordered list and may be determined between the given ordered list and others of the two or more ordered lists. One or more importance factors may be associated with at least one of the two or more ordered lists. A given importance factor may be associated with the given ordered list based at least in part on the determined total distances. A best ordered list selected from the two or more ordered lists may be determined based at least in part on the associated one or more importance factors.

Some methods may include obtaining two or more ordered lists, where the two or more ordered lists may be ranked search results generated in response to a query. Total distances may be determined between the two or more ordered lists, where a given total distance may be associated with a given ordered list and may be determined between the given ordered list and others of the two or more ordered lists. One or more importance factors may be associated with at least one of the two or more ordered lists, where a given importance factor associated with the given ordered list may be based at least in part on the determined total distances. A consensus ordered list may be determined based at least in part on an analysis of the two or more ordered lists and the associated one or more importance factors via an optimization tool. The consensus ordered list may be transmitted in response to the query.

Some example apparatus and systems related to determining a relative importance among ordered lists may be implemented in a computing device including a processor and a memory. Such a memory may be operatively associated with the processor, where the memory may have machine-readable instructions stored thereon, which, if executed by the processor, operatively enable the computing device to obtain two or more ordered lists, where the two or more ordered lists may be ranked search results generated in response to a query. Total distances may be determined between the two or more ordered lists, where a given total distance may be associated with a given ordered list and may be determined between the given ordered list and others of the two or more ordered lists. One or more importance factors may be associated with at least one of the two or more ordered lists, where a given importance factor associated with the given ordered list may be based at least in part on the determined total distances. A consensus ordered list may be determined based at least in part on an analysis of the two or more ordered lists and the associated one or more importance factors via an optimization tool. The consensus ordered list may be transmitted in response to the query.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product that is arranged in accordance with at least some embodiments of the present disclosure.

DETAILED DESCRIPTION

Figure 1:
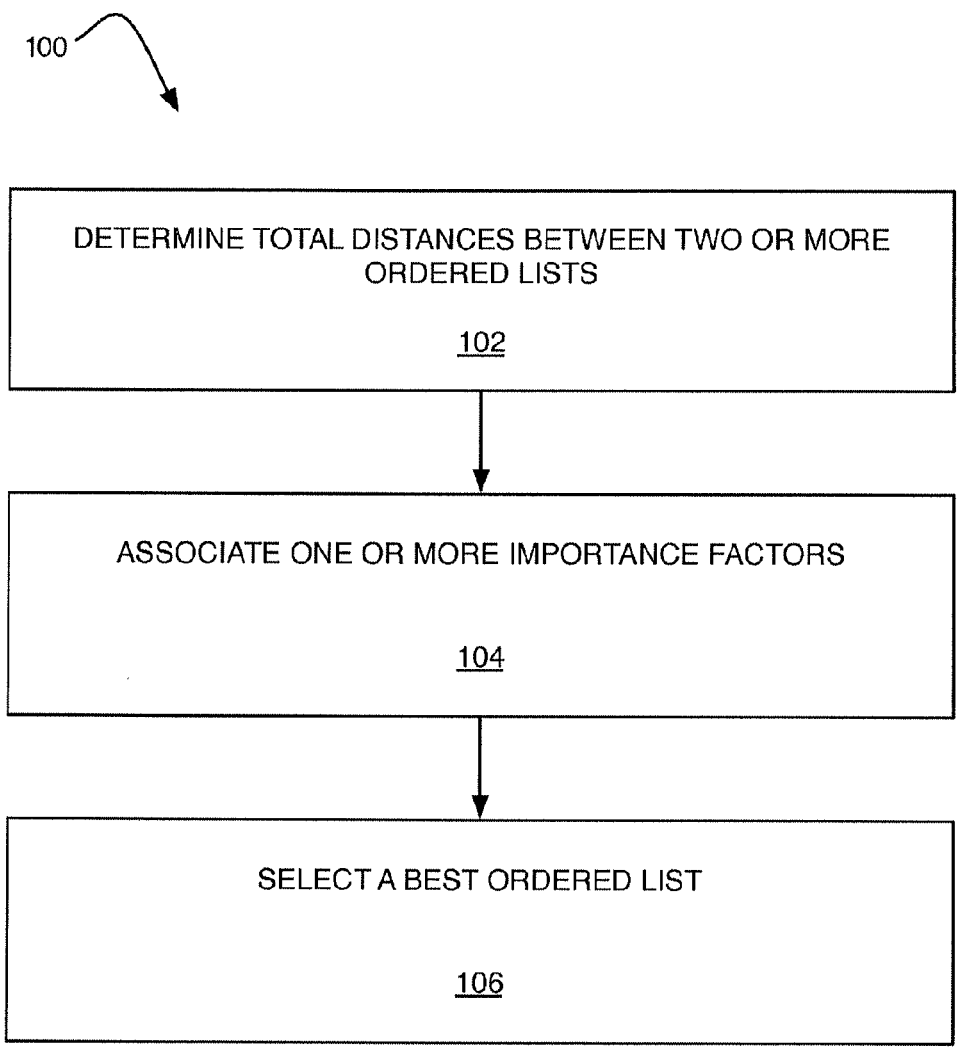
FIG. 1 illustrates an example process for determining a relative importance among ordered lists that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to determining a relative importance among ordered lists.

Assigning importance factors to different ordered lists (e.g., list of pages in web mining, list of genes in Bioinformatics, etc.) may be utilized in order to improve retrieval accuracy and efficiency in knowledge mining. Various processes are discussed below, which may determine a relative importance among ordered lists in terms of the disagreement a given ordered list has with the remaining ordered lists. In many cases, the less a given ordered list disagrees with the remaining ordered lists the better is the given ordered list's proximity with a hypothetical optimal ordering.

Various processes are discussed below that deal with improving the retrieval accuracy and efficiency in systems where multiple ranking engines produce different orderings of a set of data items. A question of whether it is possible to estimate the relative importance of the orderings has applicability in a wide range of domains (e.g., social choice theory of economics, web mining, bioinformatics, etc.). The proposed processes may utilize a quantitative way of evaluating the importance of the different rankings (e.g., different ordered lists) in an unsupervised framework. The proposed processes may be used to select the best ordering from among multiple orderings, and/or to produce a better aggregation of the multiple orderings.

FIG. 1 illustrates an example process for determining a relative importance among ordered lists that is arranged in accordance with at least some embodiments of the present disclosure. Process 100, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, may comprise one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of functional operations as indicated by example operations 102, 104, and/or 106.

As illustrated, process 100 may be implemented for determining a relative importance among ordered lists. Processing may begin at operation 102, "determine total distances between two or more ordered lists", where total distances may be determined between two or more ordered lists. Such total distances may be determined based at least in part on one or more of Kendall tau distances and Spearman's footrule distances, or the like. As used herein, the term "total distance" may refer to a measure of cumulative disagreement or cumulative agreement between a given ordered list and one or more other ordered lists. For example, a given total distance may be associated with a given ordered list and may be determined between the given ordered list and others of the two or more ordered lists. In some examples, the given total distance may be determined between the given ordered list and all of the other two or more ordered lists. In some examples, for each ordered list, operation 102 may measure total distances (e.g., cumulative disagreement or cumulative agreement) with the rest of the ordered lists.

As used herein the term "ordered list" may refer to a listing of a plurality of ordered elements. Such ordered lists may include one or more of the following information types: an ordered list of items responsive to a search query, an ordered list of genes, an ordered list of items relevant to a purchase decision, the like, and/or combinations thereof. For example, the two or more ordered lists of operation 102 may individually include a plurality of ordered elements. In such an example, the given total distance may be determined between the plurality of ordered elements associated with the given ordered list and the plurality of ordered elements associated with all of the other two or more ordered lists.

Processing may continue from operation 102 to operation 104, "associate one or more importance factors", where one or more importance factors may be associated with at least one of the two or more ordered lists. For example, a given importance factor may be associated with the given ordered list based at least in part on the determined total distances. In some examples, operation 104 may associate an importance factor to each of the ordered lists as a function of the total distance associated with each of the ordered lists. Such a given importance factor associated with the given ordered list may be proportional to a maximum total distance selected from the determined total distances. Such a given importance factor associated with the given ordered list may be inversely proportional to the given total distance associated with the given ordered list. Additional details regarding operation 104 will be discussed below in regard to FIG. 2.

Processing may continue from operation 104 to operation 106, "select a best ordered list", where a best ordered list may be selected from the two or more ordered lists. For example, such a best ordered list selected from the two or more ordered lists may be determined based at least in part on the associated one or more importance factors. Accordingly, a single ordered list from the two or more ordered lists may be found to be the best ordering among multiple orderings.

In operation, process 100 may operate so that, for each ordered list, operation 102 may measure total distances (e.g., cumulative disagreement or cumulative agreement) with the rest of the ordered lists. In such an example, operation 104 may associate an importance factor to each of the ordered lists as a function of the total distance associated with each of the ordered lists, and operation 106 may select a single ordered list as the best ordering among the multiple ordered lists.

Figure 2:
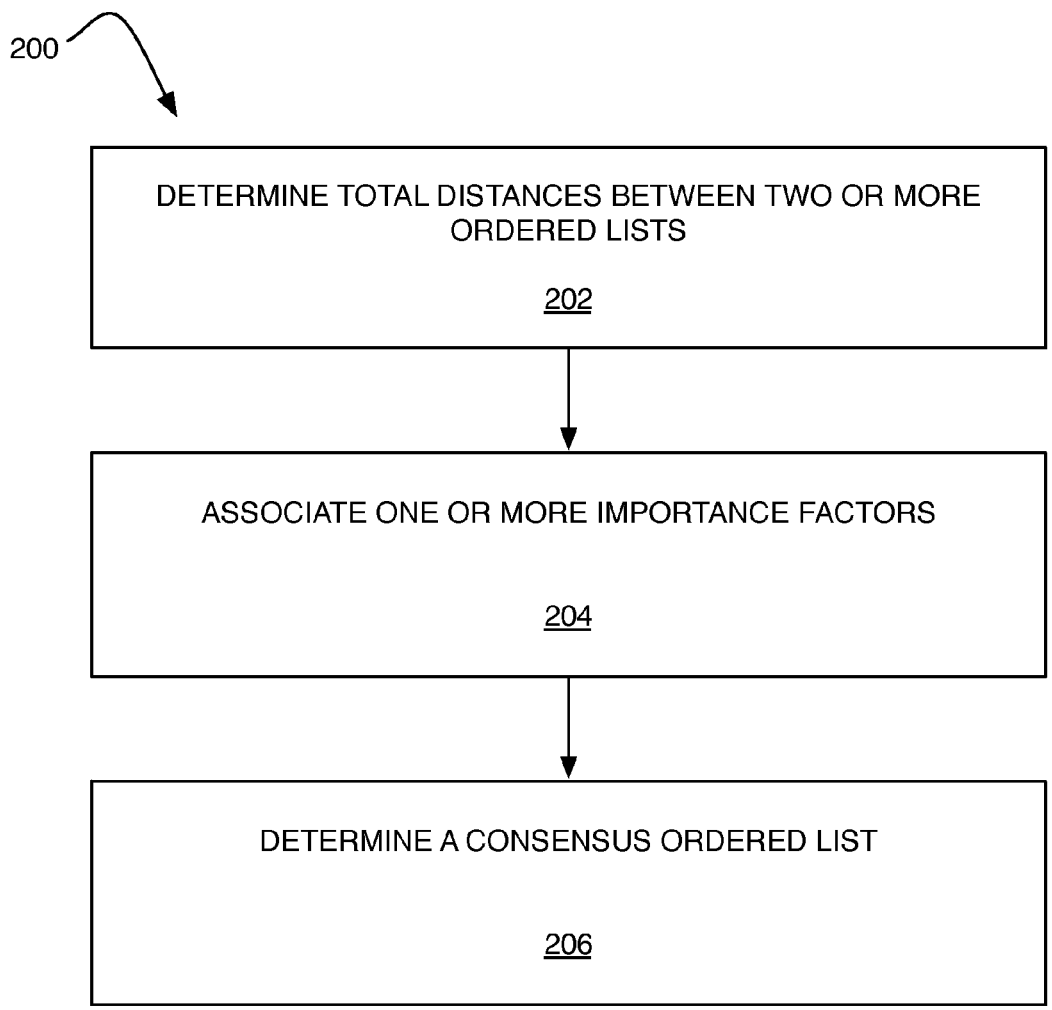
FIG. 2 illustrates a further example process for determining a relative importance among ordered lists that is arranged in accordance with at least some embodiments of the present disclosure.

FIG. 2 illustrates a further example process for determining a relative importance among ordered lists that is arranged in accordance with at least some embodiments of the present disclosure. As illustrated, process 200 may be implemented for determining a relative importance among ordered lists. Processing may begin at operation 202, "determine total distances between two or more ordered lists", where total distances may be determined between two or more ordered lists. For example, a given total distance may be associated with a given ordered list and may be determined between the given ordered list and others of the two or more ordered lists. Operation 202 may be implemented to be the same or similar to operation 102, as discussed above with reference to FIG. 1.

Processing may continue from operation 202 to operation 204, "associate one or more importance factors", where one or more importance factors may be associated with at least one of the two or more ordered lists. For example, a given importance factor may be associated with the given ordered list based at least in part on the determined total distances. Operation 204 may be implemented to be the same or similar to operation 104, as discussed above with reference to FIG. 1.

Processing may continue from operation 204 to operation 206, "determine a consensus ordered list", where a consensus ordered list may be determined. For example, such a consensus ordered list may be determined based at least in part on an analysis of the two or more ordered lists and the associated one or more importance factors via an optimization tool. Accordingly, a single consensus ordered list may be formulated to produce an aggregation of the two or more ordered lists.

As used herein the term "optimization tool" may refer to heuristics, algorithms, and/or techniques that generate useful solutions to optimization problems. Such an optimization tool may include aggregation based on evolutionary algorithms (e.g., Genetic algorithm-type aggregation tool or Cross Entropy Monte Carlo-type aggregation tool) or stochastic processes (e.g., Markov chain-type aggregation tool), the like, and/or combinations thereof.

The operation of determining a consensus ordered list (operation 206) may be done in addition to or in place of the operation of selecting a best ordered list (operation 106), discussed above with reference to FIG. 1. In some examples the operations 202, 204, and/or 206 of determining of total distances, associating of one or more importance factors, and/or determining of the consensus ordered list may be performed in an unsupervised manner. As used herein the term "unsupervised" may refer to procedures that are operable without a priori knowledge of the relevance of the considered data items and/or operable without using some supervised measures of accuracy of individual ordered lists. For example, there may be some measures in web mining that may rank retrieval systems judging their partial relevance (e.g., average precision (AP), recall level precision (RP), normalized discount cumulative gain (NDCG), and normalized average precision (NAPD)). Such supervised approaches may be subject to a priori knowledge of the relevance of the considered data items using some supervised measures of accuracy of individual lists. Such supervised approaches may be uncertain under various circumstances, and the results of supervised approaches may only be as good as the training data. Conversely, processes 100, 200, and/or 300 may optionally be conducted in a completely unsupervised manner, for objective perception of information retrieval systems.

In operation, process 200 may operate so that, for each ordered list, operation 202 may measure total distances (e.g., cumulative disagreement or cumulative agreement) with the rest of the ordered lists. In such an example, operation 204 may associate an importance factor to each of the ordered lists as a function of the total distance associated with each of the ordered lists, and operation 206 may determine a consensus ordered list as an aggregation of the multiple ordered lists.

In some examples, an ordered list of items responsive to a search query, an ordered list of genes, an ordered list of items relevant to a purchase decision, the like, and/or combinations thereof, may be analyzed. As will be described in greater detail below, ordered lists of items may be analyzed responsive to a search query (see FIG. 3). In the case of economics, an ordered list of items relevant to a purchase decision, Decision Theory, Social Choice Theory, the like, and/or combinations thereof may be analyzed. For example, when people have asymmetric preferences (e.g., some strictly prefer the status quo and others strictly prefer some other alternative), social choice typically may involve an aggregation of everyone's preferences. Such an aggregation may turn ambiguous due to the voting paradox. Processes 100, 200, and/or 300 may operate in an objective and/or unsupervised manner to avoid the voting paradox, yet follow the majority principle.

As will be described in greater detail below with respect to process 200, in the case of an ordered list of genes, a combination of multiple biological rankings might be utilized in bioinformatics. For example, microRNA (micro ribonucleic acid) target prediction algorithms may utilize non-coding RNA that may participate in cellular disease control mechanism by down regulating a target mRNA (messenger ribonucleic acid) expression. For such a microRNA target prediction algorithms, predicting potential target mRNAs of a particular microRNA may be conducted. Various computational target prediction algorithms may be used, which may, in some cases produce highly divergent lists of targets. This makes it perplexing for biologists to choose one list from such divergent lists of targets for undertaking wet lab tests to validate some putative targets. While biologically validated data might be utilized to provide an estimate of the sensitivities of such various computational target prediction algorithms, processes 100, 200, and/or 300 may operate in an objective and/or unsupervised manner to determine the relative importance (e.g., weight) of the constituent lists that may be used to judge these various computational target prediction algorithms.

Process 200 (as well as process 300) may be used in conjunction with any aggregating technique for improving the final aggregated ranking (e.g., consensus ordered list). Such a process may also increase the retrieval efficiency and accuracy in many knowledge mining systems. Such rank aggregation may be a task by which we arrive at a consensus ordered list that incurs minimum disagreement with the other participant ordered lists. Computationally such a process is NP-hard in realistic situations. It is often better to use a consensus ordered list, instead of one (or more) individual ordered lists, so as to minimize errors. An ordered list that disagrees less with the optimal list should be more accurate. However, simply measuring the distance between an ordered list and a heuristically obtained consensus ordered list to predict its importance may not yield the most accurate results. As is shown below, both theoretically and working with some computationally tractable data, the less an ordered list is distant from the other participant ordered lists using a particular distance measure, the less is its distance from a hypothetical optimal ordered list. This finding inherits the majoritarian principle according to which an ordered list that obtains support from a majority of the participant ordered lists may be naturally elected as the greatest contributor to the hypothetical optimal ordered list and so on. Additionally, process 200 is computationally deterministic.

Process 200 may be further described by the following pseudo code:

```
Declare D [|L|], ω[|L|]
For i = 1,2,3...|L|
    Set dist = 0
    For j = 1,2,3...|L|;j ≠ i
        Set dist = dist + distance (I_i, I_j)
    End For
    Set D[i] = dist /* the total distance of I_i from the other lists */
End For
For k = 1,2,3...|L|
    Set ω[k] = max (D[1],D[2],D[3],...D_{|L|}) / D[k]
End For
For p=1,2,3...|L|
    Write Importance of I_p = ω[p]
```

The above pseudo code may compute the importance factors, where $I_i$ may represent the i th ordered list, ω may represent a proposed importance factor, and distance( ) may represent a distance function, which could be any distance measuring function (e.g., Kendall's tau distance or Spearman's footrule distance).

The more an ordered list agrees with the other ordered lists, the higher will be its agreement to the hypothetical optimal ordered list. Based on this observation, importance factors may be associated to the different ordered lists, which may be used in aggregation. In other words, for each ordered list ($L_i$) an associated total distance ($d_i$) to all other participant ordered lists may be computed. The contribution of the i th list ($IF_i$) (where IF stands for importance factor), may then be estimated as $d_{max}/d_i$, where $d_{max}$=max ($d_i$), i=1, 2, ..., m, where m may represent the number of lists. Hence, smaller the $d_i$, the more is its contribution. The pseudo code, noted above, for determining the relative importance of the different ordered lists has a time complexity of $O(mk^2)$ where m may represent the number of orderings (e.g., the number of ordered lists) and k may represents the number of ordered elements.

The operation of process 200 was experimentally analyzed for improving the aggregation of ordered lists of genes. Such ordered lists of genes were obtained using three target prediction algorithms for five different microRNAs, namely, hsa-mir-124, hsa-mir-135, hsa-mir-144, hsa-mir-150 and hsa-mir-155. Genetic algorithm (GA) and Cross-Entropy (CE) based aggregation algorithms (as described by Pihur, V., Datta, S., and Datta. S. (2009) RankAggreg, an R package for weighted rank aggregation, BMC Bioinformatics) were used to obtain a consensus ranking.

Genetic algorithm and Cross-Entropy Monte Carlo were used to obtain a consensus ordered list by minimizing the Kendall's tau or Spearman's footrule distance of the consensus ordered list from the participant ordered lists. Rank aggregation of partial lists is a NP Hard (non-deterministic polynomial-time hard) problem. Therefore GA and CE were used to solve this problem employing the power of evolutionary computation. While computing the fitness of the solutions in GA/CE, the following objective function was used:

$$\delta^* = \operatorname{argmin} \sum_{i=1}^{m} \omega_i d(\delta, L_i), \quad (1)$$

Here δ may represent a solution of GA/CE (e.g., a consensus ordered list of length k=|$L_i$|), $L_i$ may represent the i th ordered list, $\omega_i$ may represent the proposed importance factor associated with ordered list $L_i$ and d may represent the distance function, which could be any distance measuring function (e.g., Kendall's tau distance or Spearman's footrule distance). Note that process 200 may utilize an importance vector (IV) that may represent a collection of the m importance factors. The idea is to find that consensus ordered list δ* (by using GA/CE) which would minimize the total distance between solution δ* and ordered list $L_i$. Process 200 may help to determine the proposed importance factor $\omega_i$ values in an unsupervised manner.

The results obtained using the importance vector (IV) were compared with approaches that did not use such an importance vector (IV). Table 1 shows the distances, in terms of the Kendall's tau distance, of the obtained consensus list with all the input lists. If it is assumed that the result provided by GA/CE (with or without the proposed importance vector (IV)) be δ*, then the Kendall's tau distances (denoted by the function d) reported in Table 1 may be computed as:

$$\sum_{i=1}^{m} d(\delta^*, L_i). \quad (2)$$

Table 1 illustrates the comparative Kendall's tau distances between participant ordered lists and a consensus ordered list obtained with and without the importance vector (IV).

| microRNA | Op-timization by GA using IV | Op-timization by GA not using IV | Op-timization by CE using IV | Op-timization by CE not using IV | MC4 Proposed by Dwork et. al. |
| --- | --- | --- | --- | --- | --- |
| hsa-miR-124 | 1316 | 1369 | 514 | 1044 | 957 |
| hsa-miR-135 | 1364 | 1385 | 230 | 1226 | 1309 |
| hsa-miR-144 | 1275 | 1401 | 516 | 1182 | 1110 |
| hsa-miR-150 | 1238 | 1264 | 999 | 1106 | 1227 |
| hsa-miR-155 | 1474 | 1497 | 1072 | 1169 | 1401 |

As is evident, the consistently smaller distances, obtained using the proposed importance vector (IV), indicate its effectiveness in increasing the prediction/retrieval accuracy. In order to demonstrate the effectiveness of incorporating the importance vector (IV), Table 1 shows results of the GA executed using importance vector (IV) of process 200, the GA executed without importance vector (IV), the CE executed using importance vector (IV) of process 200, and the CE executed without importance vector (IV). Additionally, Table 1 shows results of a Markov chain rank aggregation method as proposed in U.S. Pat. No. 7,188,106, where MC4 represents the Markov chain rank aggregation, where the transition matrix for the chain was prepared using the MC4 algorithm, as discussed in Dwork, C., Kumar, R., Naor, M., and Sivakumar, D. (2001) Rank Aggregation Methods for the Web, Proc. 10th International World Wide Web Conference, 613-620. The Kendall's tau distances of the resultant consensus ordered lists (obtained with and without the weights) from the participant ordered lists.

As illustrated in Table 1, the results obtained using the objectively determined weights of process 200 ((Optimization by GE using IV and Optimization by CE using IV) outperformed those computed without assigning such weights (Optimization by GE not using IV and Optimization by CE not using IV not using IV). The result obtained using the CE algorithm in conjunction with the importance factors (Optimization by CE using IV) out performed rest of the methods including Markov chain rank aggregation (MC4 proposed by Dwork et. al.) in all tested cases. For each case, the best result out of five executions is reported in Table 1. The results suggest that use of importance vector (IV) of process 200 consistently improves the approximation.

Figure 3:
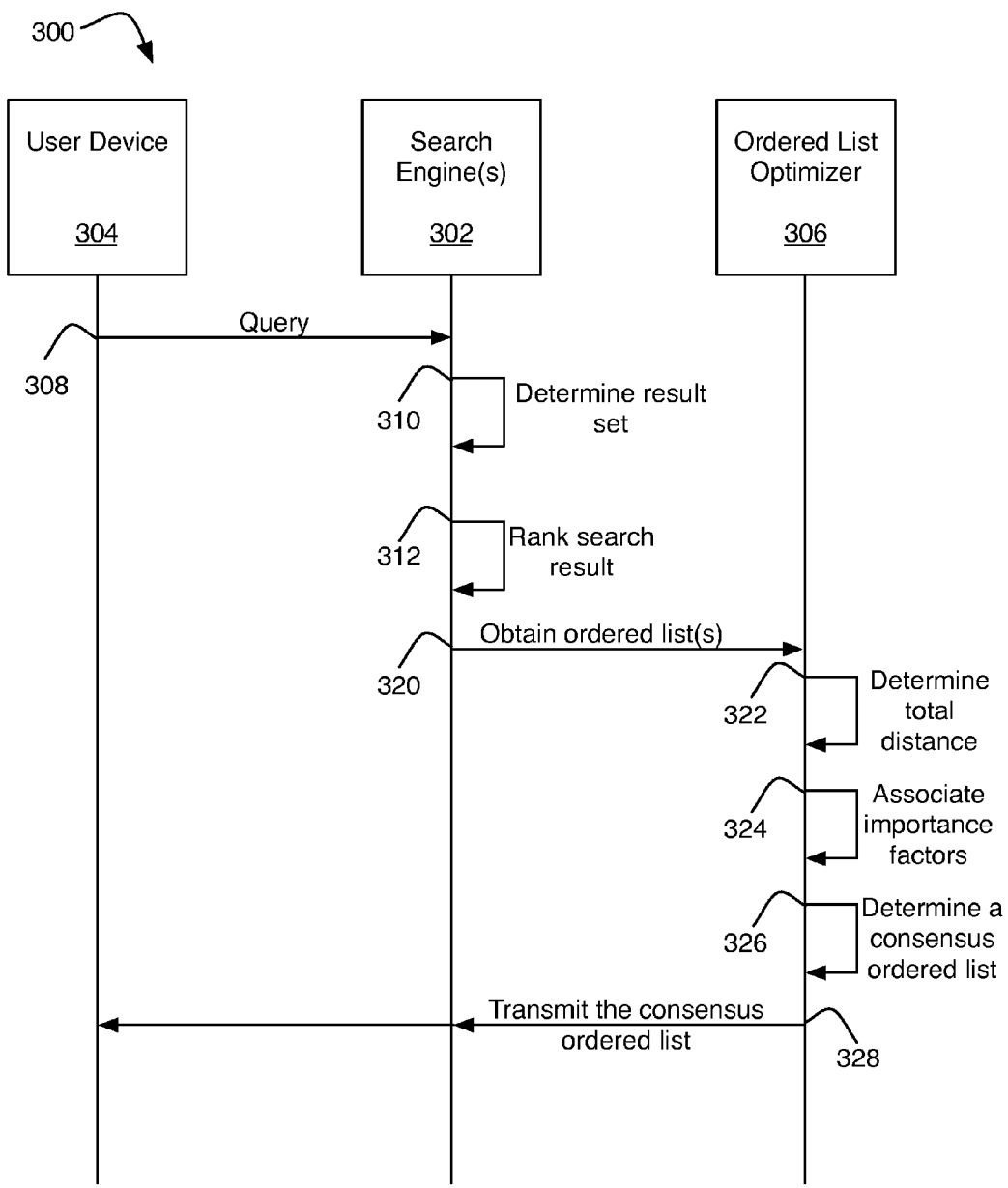
FIG. 3 illustrates another example process for determining a relative importance among ordered lists that is arranged in accordance with at least some embodiments of the present disclosure that is arranged in accordance with at least some embodiments of the present disclosure.

FIG. 3 illustrates another example process for determining a relative importance among ordered lists that is arranged in accordance with at least some embodiments of the present disclosure that is arranged in accordance with at least some embodiments of the present disclosure. As discussed above, ordered lists may include an information type including an ordered list of items responsive to a search query. For example, such an ordered list of items may be obtained by a search engine 302 in response to a search query. Such a search engine 302 may include an Internet-type search engine or another type of engine capable of processing a request for information retrieval with database and/or information systems, for example.

As illustrated, search engine 302 may communicate with a user device 304 and/or an ordered list optimizer 306. Search engine 302 and ordered list optimizer 306 are illustrated as separate devices; however, it will be appreciated that all or part of the operations of ordered list optimizer 306 could be performed via search engine 302, for example. Additionally or alternatively, search engine 302 and/or ordered list optimizer 306 may include additional components not illustrated here.

In the illustrated example, ordered lists of items may be analyzed responsive to a search query. In other examples, an ordered list of genes, an ordered list of items relevant to a purchase decision, the like, and/or combinations thereof, may be analyzed in the same or in a similar manner. In the illustrated example analysis responsive to a search query, one or more search engines 302 may be employed in query based document retrieval by combining the ranked search results (e.g., ordered lists) produced by different search engines 302. Individual search engines 302 may rank according to various internal search criterion. The assigning of relative importance to these ranked search results may be utilized in web mining. In operation, process 300 may assign importance factors to the different ranked search results. Such assigned importance factors may thereafter be utilized for combining the ranked search results in order to produce an aggregate list (e.g., a consensus ordered list).

As illustrated, process 300 may be implemented for determining a relative importance among ordered lists in conjunction with search engine 302 and/or ordered list optimizer 306. Processing may begin at operation 308, "query", where a query may be received. For example, search engine 302 may receive a query from user device 304.

Processing may continue from operation 308 to operation 310, "determine result set", where a result set may be determined. For example, search engine 302 may determine which data items may relate to a query and return a result set. For example, search engine 302 may include a search component (not shown) capable of searching data items associated with a database and/or other information system. In some examples, search engine 302 may search an index of data items associated with a database and/or other information system.

Processing may continue from operation 310 to operation 312, "rank search result", where the result set may be ranked. For example, search engine 302 may rank the result set into an ordered list. For example, search engine 302 may include a ranking component (not shown) capable of ranking such a result set such that the most relevant data items in the result set may be presented to user device 304 first, according to descending relevance. For example, a first data item in the result set may be the one determined to be the most relevant in response to the query and the last data item in the result set may be the least relevant while still falling within the scope of the query.

Processing may continue from operation 312 to operation 320, "obtain ordered lists", where two or more ordered lists may be obtained. In the illustrated example, two or more ordered lists may be received by ordered list optimizer 306 from search engine 302. For example, the two or more ordered lists may be ranked search results generated in response to query 308. In some examples, ordered list optimizer 306 may receive single ordered lists from a plurality of search engines 302, a plurality of ordered lists from a single search engine 302, or a combination thereof. For example, a single search engine 302 might perform operation 310 multiple times according to varying criteria, perform operation 312 multiple times according to varying criteria, or perform both operations 310 and 312 multiple times according to varying criteria in order to generate plurality of ordered lists. Additionally or alternatively, two or more ordered lists may be determined by ordered list optimizer 306 itself.

Processing may continue from operation 320 to operation 322, "determine total distances", where total distances may be determined between two or more ordered lists. For example, a given total distance may be associated with a given ordered list and may be determined between the given ordered list and others of the two or more ordered lists via ordered list optimizer 306. Operation 322 may be implemented to be the same or similar to operation 202, as discussed above with reference to FIG. 2.

Processing may continue from operation 322 to operation 324, "associate importance factors", where one or more importance factors may be associated with at least one of the two or more ordered lists. For example, a given importance factor may be associated with the given ordered list based at least in part on the determined total distances via ordered list optimizer 306. Operation 324 may be implemented to be the same or similar to operation 204, as discussed above with reference to FIG. 2.

Processing may continue from operation 324 to operation 326, "determine a consensus ordered list", where a consensus ordered list may be determined. For example, such a consensus ordered list may be determined based at least in part on an analysis of the two or more ordered lists and the associated one or more importance factors via an optimization tool utilized by ordered list optimizer 306. Operation 326 may be implemented to be the same or similar to operation 206, as discussed above with reference to FIG. 2.

Processing may continue from operation 326 to operation 328, "transmit the consensus ordered list", where the consensus ordered list may be transmitted. For example, the consensus ordered list may be transmitted from ordered list optimizer 306 in response to the query from user device 304. The consensus ordered list may be transmitted from ordered list optimizer 306 to search engine 302 and/or user device 304.

FIG. 4 illustrates an example computer program product 400 that is arranged in accordance with at least some examples of the present disclosure. Computer program product 400 may include a signal bearing medium 402. Signal bearing medium 402 may include one or more machine-readable instructions 404, which, if executed by one or more processors, may operatively enable a computing device to provide the functionality described above with respect to FIG. 1, FIG. 2, and/or FIG. 3. Thus, for example, referring to the system of FIG. 5 one or more computing device 500 may undertake one or more of the actions shown in FIG. 1, FIG. 2, and/or FIG. 3 in response to instructions 404 conveyed by signal bearing medium 402.

In some implementations, signal bearing medium 402 may encompass a non-transitory computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass communications medium 410, such as, but not limited to, a digital and/or an analog communication medium (e.g., a fiber optic cable, a waveguide, a wired communications link, a wireless communication link, etc.).

Figure 5:
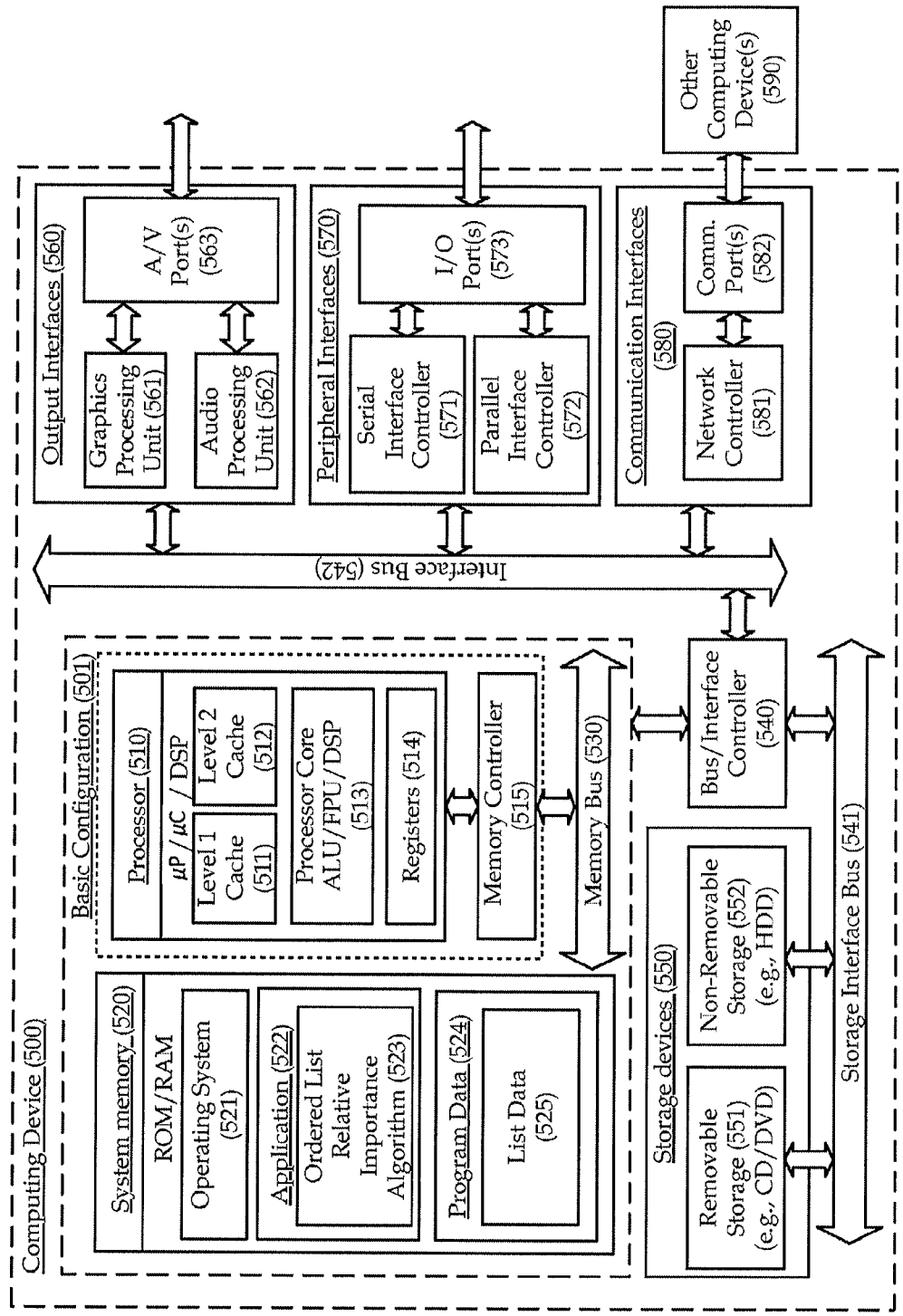
FIG. 5 is a block diagram of an illustrative embodiment of a computing device arranged in accordance with at least some embodiments of the present disclosure.

FIG. 5 is a block diagram illustrating an example computing device 500, such as might be embodied by a person skilled in the art, that is arranged in accordance with at least some embodiments of the present disclosure. In one example basic configuration 501, computing device 500 may include one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a ordered list relative importance algorithm 523 that is arranged to perform the functions as described herein including the functional blocks and/or actions described with respect to process 100 of FIG. 1, process 200 of FIG. 2, and/or process 300 of FIG. 3. Program Data 524 may include list data 525 for use with ordered list relative importance algorithm 523. In some example embodiments, application 522 may be arranged to operate with program data 524 on an operating system 521 such that implementations of determining the relative importance of ordered lists may be provided as described herein. For example, one or more devices may comprise all or a portion of computing device 500 and be capable of performing all or a portion of application 522 such that implementations of determining the relative importance of ordered lists may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method for determining a relative importance by a server, comprising:
   receiving a query from a user device;
   determining a first and second ordered list by a first and second search engine, respectively, in response to the query;
   ranking the first and second ordered list according to internal search criteria; and
   receiving a determined consensus ordered list, the determined consensus ordered list based at least in part upon an analysis of the first and second ranked ordered list and an optimization of an importance vector via an optimization tool, the first and second ranked ordered list including one or more importance factors.

2. The method of claim 1, wherein the importance vector is based at least in part upon the one or more importance factors.

3. The method of claim 2, wherein the one or more importance factors is based at least in part on a determined total distance.

4. The method of claim 3, wherein the determined total distance includes a distance between the first and second ranked ordered list.

5. The method of claim 3, wherein the determined total distance is determined based at least in part on Kendall tau distances or Spearman's footrule distances.

6. The method of claim 1, wherein each of the first and second ranked ordered list includes a plurality of ordered elements.

7. The method of claim 1, wherein the first and second ranked ordered list includes one or more following information types: an ordered list of items responsive to a search query, an ordered list of genes, and an ordered list of items relevant to a purchase decision.

8. The method of claim 1, wherein the determined consensus ordered list is determined by:
   determining two or more potential consensus ordered lists, wherein a given ordered list is determined based at least in part upon minimizing a total distance between the given potential ordered list and the first and second ranked ordered list; and
   minimizing an objective function based at least in part upon the importance vector, the two or more potential consensus ordered lists, the first and second ranked ordered list, and the determined total distance.

9. The method of claim 8, wherein the determining two or more potential consensus ordered lists includes minimizing the total distance between a given ordered list and the first and second ranked ordered list based at least in part upon application of a genetic algorithm or a cross-entropy Monte Carlo analysis.

10. A method for determining a relative importance by a server, comprising:
   sending two or more ordered lists, the two or more ordered lists including ranked search results generated in response to a query; and
   receiving a consensus ordered list in response to the query,
      the consensus ordered list based at least in part on an analysis of the two or more ordered lists and an importance vector via an optimization tool,
      the importance vector based at least in part upon one or more associated importance factors,
      the one or more associated importance factors associated with the two or more ordered lists based at least in part on a determined total distance, and
      the determined total distance includes a distance between the two or more ordered lists.

11. The method of claim 10, wherein the determined total distance is based at least in part on Kendall tau distances or Spearman's footrule distances.

12. The method of claim 10, wherein each of the two or more ordered lists includes a plurality of ordered elements.

13. The method of claim 10, wherein the consensus ordered list is determined by:
   determining two or more potential consensus ordered lists, wherein a given ordered list is determined based at least in part upon minimizing a total distance between the given potential ordered list and the two or more ordered lists; and
   minimizing an objective function based at least in part upon the importance vector, the two or more potential consensus ordered lists, the two or more ordered lists, and the determined total distance.

14. The method of claim 13, wherein the determining two or more potential consensus ordered lists includes minimizing the total distance between a given ordered list and the two or more ordered lists based at least in part upon application of a genetic algorithm or a cross-entropy Monte Carlo analysis.

15. A non-transitory computer-readable medium storing executable instructions that, when executed, cause a computer to perform operations comprising:
   receiving a query from a user device;
   determining two or more ordered lists by two or more search engines, respectively, in response to the query;
   ranking the two or more ordered lists according to internal search criteria;
   sending the two or more ordered lists to an ordered list optimizer; and
   receiving a consensus ordered list from the ordered list optimizer,
      the consensus ordered list based at least in part on an analysis of the two or more ordered lists and an importance vector via an optimization tool,
      the importance vector based at least in part upon one or more associated importance factors,
      the one or more associated importance factors associated with the two or more ordered lists based at least in part on a determined total distance, and
      the determined total distance includes a distance between the two or more ordered lists.

16. The non-transitory computer-readable medium of claim 15, wherein the determined total distance is based at least in part on Kendall tau distances or Spearman's footrule distances.

17. The non-transitory computer-readable medium of claim 15, wherein each of the two or more ordered lists includes a plurality of ordered elements.

18. The non-transitory computer-readable medium of claim 15, wherein the consensus ordered list is determined by:
   determining two or more potential consensus ordered lists, wherein a given ordered list is determined based at least in part upon minimizing a total distance between the given potential ordered list and the two or more ordered lists; and
   minimizing an objective function based at least in part upon the importance vector, the two or more potential consensus ordered lists, the two or more ordered lists, and the determined total distance.

19. The non-transitory computer-readable medium of claim 18, wherein the determining two or more potential consensus ordered lists includes minimizing the total distance between a given ordered list and the two or more ordered lists based at least in part upon application of a genetic algorithm or a cross-entropy Monte Carlo analysis.

* * * * *